United States Patent
Fedorovich

(10) Patent No.: US 6,726,214 B2
(45) Date of Patent: Apr. 27, 2004

(54) WRAP-AROUND SEVERE SPLASH SEAL

(75) Inventor: George Fedorovich, Nacogdoches, TX (US)

(73) Assignee: JM Clipper Corporation, Nacagdoches, TX (US)

(*) Notice: Subject to any disclaimer, the term of this patent is extended or adjusted under 35 U.S.C. 154(b) by 22 days.

(21) Appl. No.: 10/051,227

(22) Filed: Jan. 22, 2002

(65) Prior Publication Data

US 2002/0063392 A1 May 30, 2002

Related U.S. Application Data

(63) Continuation-in-part of application No. 09/200,152, filed on Nov. 25, 1998, now Pat. No. 6,336,637.

(51) Int. Cl.$^7$ .............................................. F16J 15/447
(52) U.S. Cl. ........................ 277/419; 277/418; 277/420; 277/349
(58) Field of Search ................................. 277/420, 419, 277/418, 349, 350, 559, 412

(56) References Cited

U.S. PATENT DOCUMENTS

| | | | | |
|---|---|---|---|---|
| 4,466,620 A | * | 8/1984 | Orlowski | 277/412 |
| 4,706,968 A | * | 11/1987 | Orlowski | 277/347 |
| 5,522,601 A | * | 6/1996 | Murphy | 277/421 |
| 5,735,530 A | | 4/1998 | Merkin et al. | |
| 5,967,524 A | * | 10/1999 | Fedorovich | 277/351 |
| 6,062,568 A | * | 5/2000 | Orlowski et al. | 277/348 |
| 6,336,637 B1 | * | 1/2002 | Fedorovich | 277/420 |
| 6,419,233 B2 | * | 7/2002 | Orlowski | 277/411 |

* cited by examiner

Primary Examiner—Anthony Knight
Assistant Examiner—Enoch E Peavey
(74) Attorney, Agent, or Firm—Dickstein Shapiro Morin & Oshinsky LLP

(57) ABSTRACT

A wrap-around interlocked labyrinth seal adapted to be mounted upon a rotating shaft, having a rotor and a stator. A flange positioned on the stator completely encircles the rotating shaft. The stator is interlocked by positioning a cover of the stator within a radial opening of the rotor and interlocking the cover with an enclosure member of the rotor. One embodiment of the seal includes an interlocking member as part of the cover. The interlocking member interlocks with a flange of the rotor.

21 Claims, 9 Drawing Sheets

WRAP-AROUND SEVERE SPLASH SEAL

CROSS-REFERENCE TO RELATED APPLICATIONS

This application is a continuation-in-part of U.S. application Ser. No. 09/200,152, filed Nov. 25, 1998, the entire disclosure of which is incorporated herein by reference, and claims priority therefrom.

FIELD OF THE INVENTION

The present invention relates to a device for providing a static and a dynamic seal between a rotatable shaft and a housing. In particular, the present invention relates to a seal device for inhibiting oil from leaking out of a housing and/or for inhibiting contaminants from traveling into the housing in severe splash conditions.

BACKGROUND

Prior art devices for sealing a rotating shaft are disclosed in U.S. Pat. No. 4,022,479 (Orlowski). Seal devices of this type may be used to inhibit oil from escaping out of a bearing housing and/or to inhibit contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To inhibit such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

Some prior art references refer to the use of a rotor and a stator, the latter including a plurality of alternating annular grooves and ridges and an axial groove. The grooves and ridges catch oil thrown by the rotating shaft. The oil then drains by gravity to the axial groove which allows the oil to travel back into the housing. One such reference, U.S. Pat. No. 5,522,601 (Murphy), refers to a locking labyrinth sealing assembly where a flange on a rotor wraps around and interlocks with a flange on a stator. The Murphy device, however, lacks an air-side opening and an oil-side opening which is sealed at the rotating shaft, making such a device susceptible to oil leakage in severe splash applications.

Other prior art references, such as, for example, U.S. Pat. No. 4,667,967 (Deuring), U.S. Pat. No. 4,065,136 (Miller) and U.S. Pat. No. 3,343,891 (Shipman) refer to sealing devices utilizing two or more pieces. Each of these seal devices lacks an air-side opening and an oil-side opening which is sealed at the rotating shaft. These types of seal devices may have deficiencies in applications where large amounts of oil can inundate the seals, such as in side-mounted pump bearing frames having double row thrust bearings where the seals are close to the bearings.

SUMMARY

The problems of the prior art are overcome to a great extent by the present invention, which relates to a two-piece, interlocked labyrinth seal and a sealed system including a two-piece, interlocked labyrinth seal. The labyrinth seal includes a rotating member, such as a rotor, and a stationary member, such as a stator. The rotor includes an intermediate portion and an enclosure member surrounding a radial opening, and the stator includes a main body portion with annular ridges and a cover positioned within the radial opening. The cover interlocks with the enclosure member. One of the annular ridges is adapted to restrict passage of air through the seal when the seal is mounted to a shaft.

The invention also provides a two-piece interlocked labyrinth seal. The seal includes a rotor with an intermediate portion, an enclosure member and a flange surrounding a radial opening, and a stator with a main body portion, having a plurality of annular ridges, and a cover positioned within the radial opening. The cover interlocks with the flange.

The invention further provides a sealed system that includes a rotatable shaft, a housing, and a two-piece interlocked labyrinth seal mounted on the housing and around the shaft. The seal includes a rotor with an intermediate portion and an enclosure member surrounding a radial opening, and a stator with a main body portion, having a plurality of annular ridges, and a cover positioned within the radial opening. The cover interlocks with the enclosure member. One of the annular ridges restricts passage of air between the seal and the rotatable shaft.

The invention further provides a sealed system that includes a rotatable shaft, a housing, and a two-piece interlocked labyrinth seal mounted on the housing and around the shaft. The seal includes a rotor with an intermediate portion, an enclosure member and a flange surrounding a radial opening, and a stator with a main body portion, having a plurality of annular ridges, and a cover positioned within the radial opening. The cover interlocks with the flange.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 1:
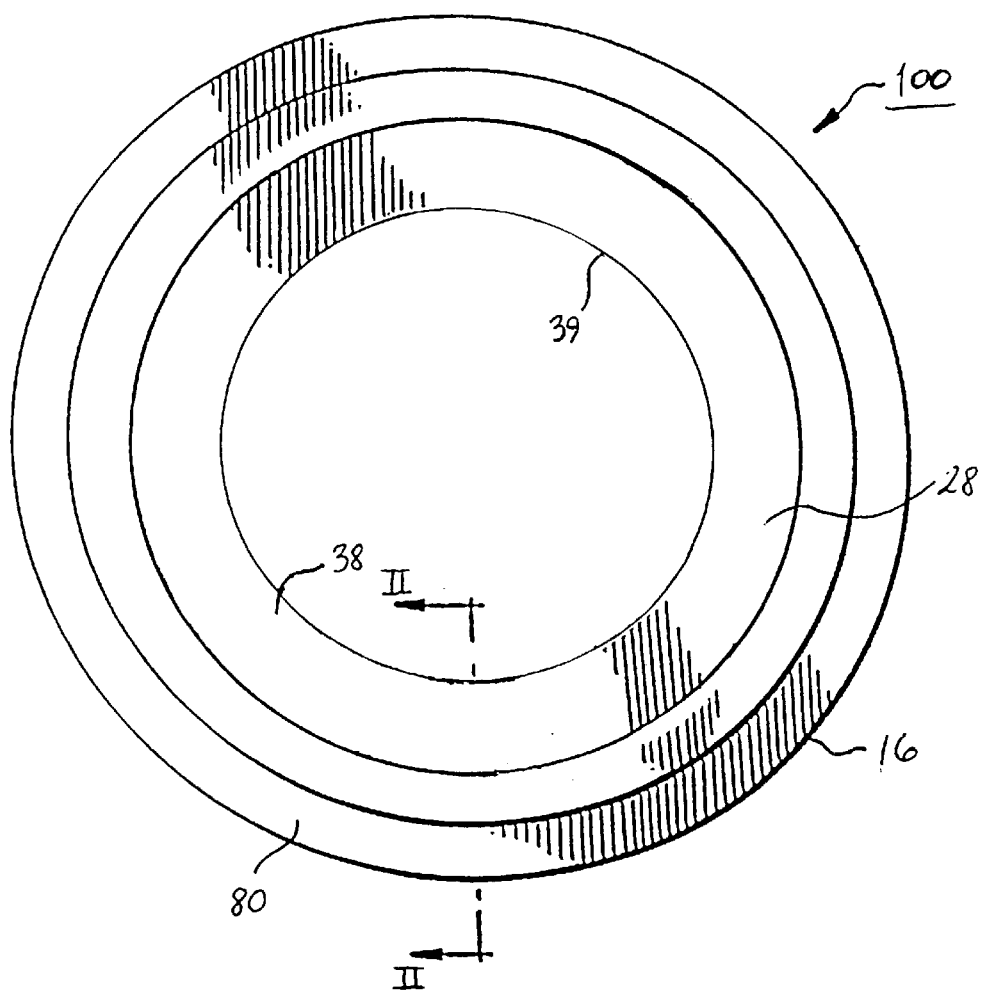
FIG. 1 is a front elevational view of a seal device constructed in accordance with a preferred embodiment of the present invention.
Figure 2:
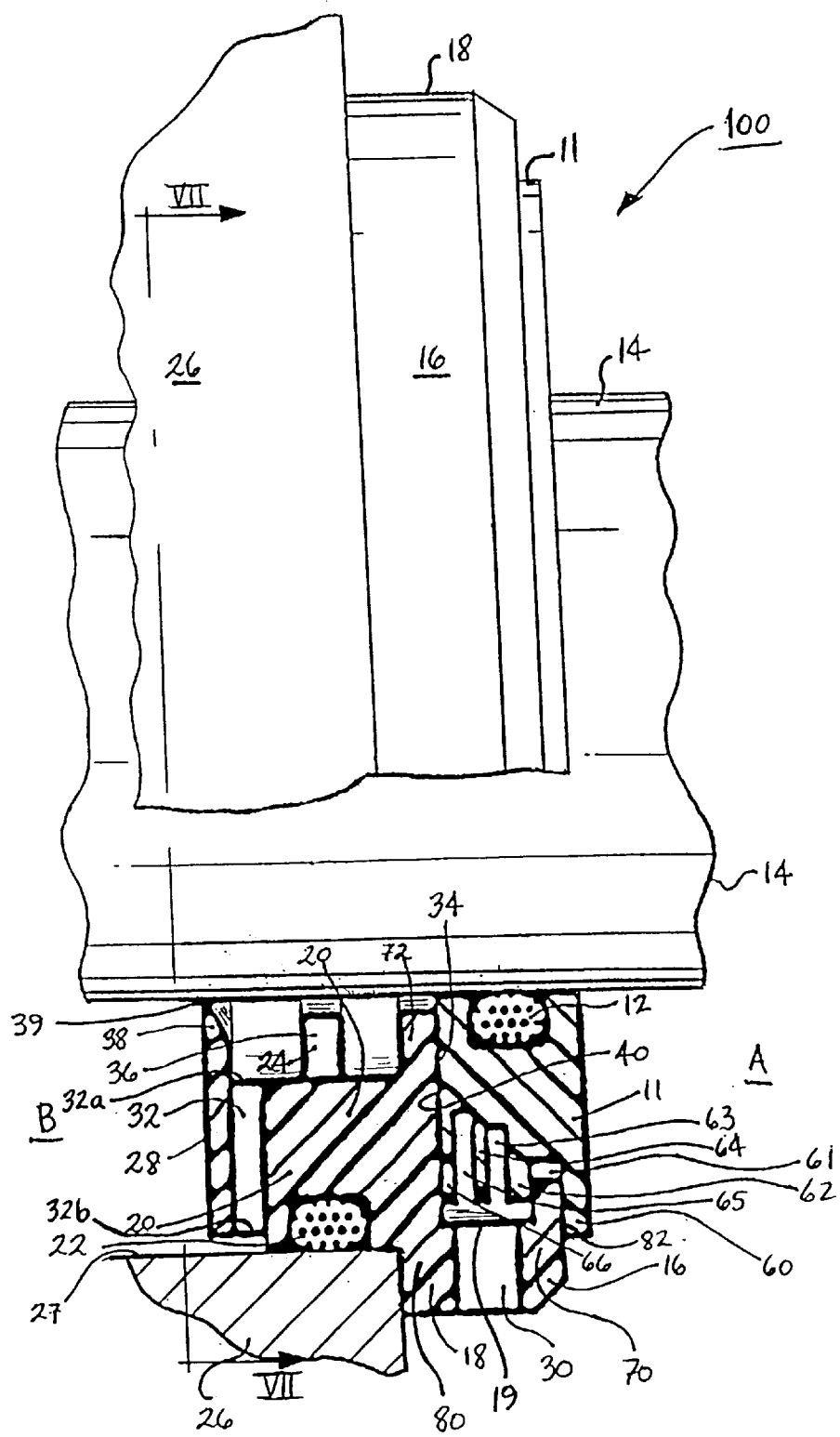
FIG. 2 is a partial cross sectional side view of the seal device of FIG. 1, taken along line II—II of FIG. 1, showing the seal device employed within a sealed system.
Figure 7:
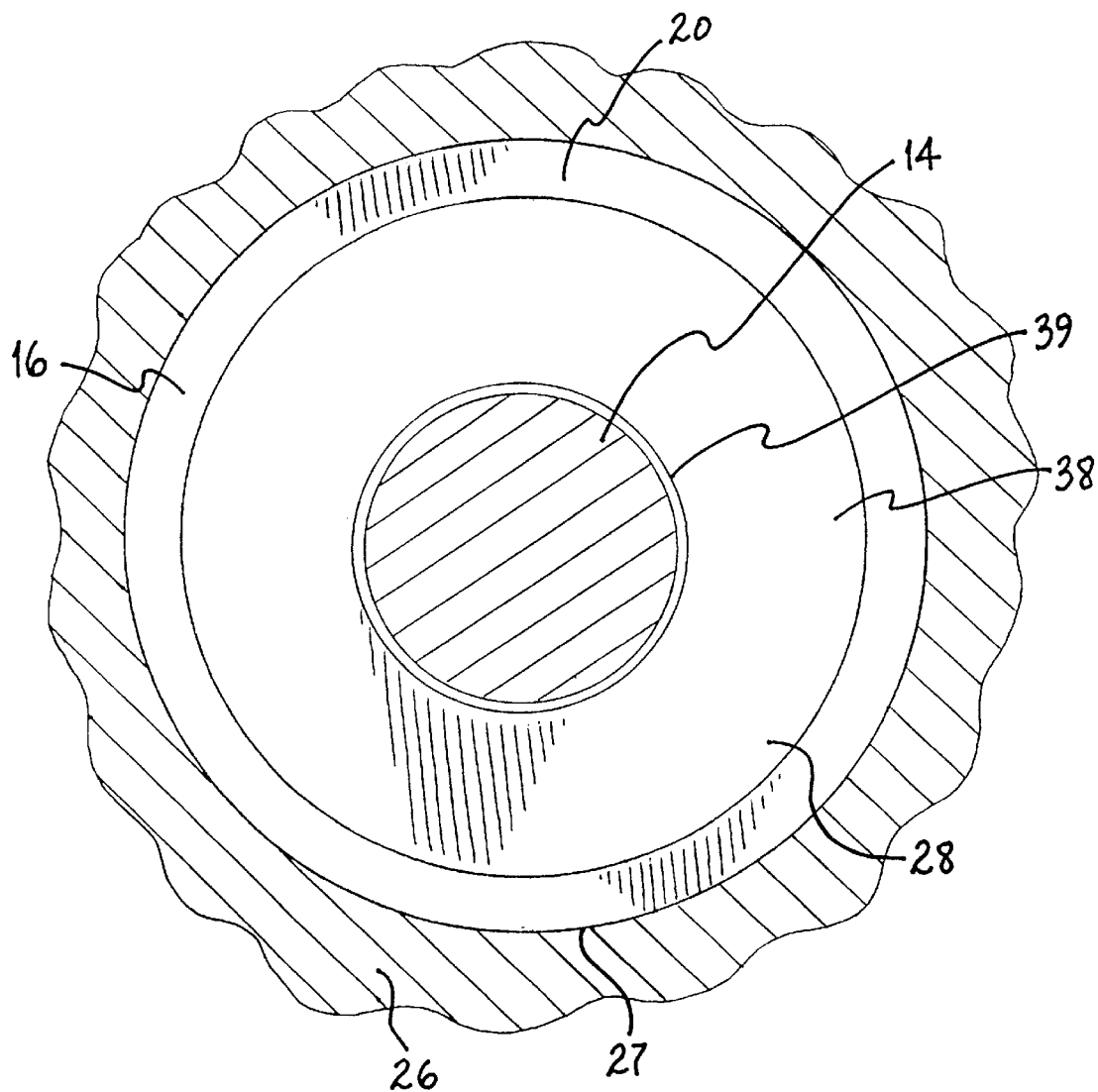
FIG. 7 is a back elevational view of the seal device of FIG. 1 taken along line VII—VII of FIG. 2, showing the seal device employed with a rotating shaft.

Referring now to FIGS. 1, 2 and 7, a labyrinth seal 100 is shown having a rotor 11 affixed to a rotatable shaft 14 via an O-ring 12. The labyrinth seal provides an obstructed, or mazelike, passageway between at least two components, and which provides dynamic and static sealing through an arrangement whereby the static component of the device does not contact, or contacts only inconsequentially, the rotating component of the device and the rotating shaft about which the rotating component is mounted. The contact is so slight that it will not result in unacceptable damage to the seal or the rotating shaft.

A stator 16 is affixed to a stationary housing 26 via an O-ring 22. The rotor 11 includes alternating annular ridges 60, 62, 64, 66 and annular grooves 61, 63, 65. As shown, the annular groove 65 extends radially inward farther than the groove 63, which itself extends radially inward farther than the groove 61.

The stator 16 includes a cover portion 18 and a main portion 20. Within the cover portion 18 is an air-side opening 30, a radially inward protrusion 70, and a cover shoulder 80 which abuts the housing 26. The main portion 20 includes an annular ridge 72 having an air side facing surface 34, a second annular ridge 24 through which an axial groove 36 extends, a stator flange 38 having an end face 28, and an oil-side opening 32, having two open ends 32a, 32b. The main portion 20 of the stator 16 completely encircles the rotating shaft 14. Specifically, the stator flange 38 extends around the entire circumference of the shaft 14 without an opening in the end face 28. In this way, the stator 16 is adapted to completely surround the shaft 14.

The stator 16 interlocks with the rotor 11 to create the two-piece, interlocked labyrinth seal 100. Specifically, the annular protrusion 70 fits within the annular groove 61 and the surfaces 34, 40 face one another with a narrow gap therebetween. This arrangement allows the rotor 11 to rotate with the shaft 14 and relative to the stator 16 and the housing 26 with no more than inconsequential contact between the rotor 11 and the stator 16.

The rotor 11 is preferably interlocked with the stator 16 prior to mounting onto the shaft 14. The stator 16 is assembled with the rotor 11 by either thermally contracting or expanding one of the pieces, such as expanding the stator 16, mechanically expanding the stator 16 relative to the rotor 11 by, for example, snapping together the stator 16 and the rotor 11 or by pushing the stator 16 over the rotor 11. Alternatively, a combination of these two methods, or another suitable interlocking mechanism may be used. In operation, the rotor 11 rotates with the shaft 14 and relative to the stator 16. The seal 100 is positioned about the shaft 14 between an air side A and an oil side B located within the housing 26.

A narrow gap 82 is provided between the rotor 11 and the stator 16. The lengths of the ridges 60, 62, 64, 66 and the depths and widths of the grooves 61, 63, 65 may be such that the contaminants entering the seal 100 from the air-side A through the gap 82 are sufficiently slowed to allow some or all of the contaminants to drop out of the seal 100 by gravity through the air-side opening 30. In operation, contaminants making their way through the groove 61 are flung radially outwardly into the space radially outward of the ridges 62, 64, 66. The varying widths of the grooves 61, 63, 65 assist in controlling the speed of the contaminants. The narrower the width, the greater the speed of the contaminants through that groove. The greater the width, the slower the speed of the contaminants. The relatively wide space radially outward of the ridges 62, 64, 66 and the grooves 63, 65 allows the speed of the contaminants to drop, such that the contaminants contact an inner surface 19 of the cover 18 and exit the seal 100 through the air-side opening 30.

In certain applications, such as, for example, in side-mounted pump bearing frames having double row thrust bearings in which the seals are close to the bearings, oil on the oil side B splashes up severely. To inhibit leakage during such severe splashes, the illustrated device has the flange 38 and the oil-side opening 32 positioned on the stator main portion 20. The flange 38 is positioned relative to the shaft 14 so as to hinder movement of oil from the oil side B into the interior of the seal 100. Specifically, in the embodiment shown, the annular tip 39 of the flange 38 may be positioned about 0.02 inches from the shaft 14 for typical oil applications. This tolerance may be varied depending upon the viscosity of the oil, the rotational speed of the shaft 14, the temperature within the housing 26, or other factors. If the flange 38 is formed of a material which will not unacceptably damage the shaft 14, such as, for example, polytetrafluoroethylene (PTFE), the flange 38 can be allowed to contact the shaft 14 in some applications. Furthermore, the flange 38 is provided without any opening in its end face 28. Thus, oil is hindered from migrating from the oil side B since the potential pathways for such a migration may only be through the clearance between the tip of the flange 38 and the shaft 14 or through the open end 32b of the oil-side opening 32.

During certain severe splash applications, oil may nevertheless migrate from the oil side B past the flange 38 and into the interior of the seal 100. The oil-side opening 32 open end 32b is positioned radially outward of the open end 32a, and the direction between the open ends 32a, 32b is transverse, and may be generally perpendicular, to the shaft 14. The oil-side opening 32 provides a return egress to allow oil which has splashed up axially beyond the flange 38 to return to an oil reservoir positioned on the oil side B. The opening 32 extends through the main portion 20 of the stator 16 and exits at open end 32b opposite an underside surface 27 of the housing 26. Any oil that migrates into the interior of the seal 100 is flung radially outwardly by the rotating shaft 14. The combination of the rotating shaft 14, the annular ridges 72, 24, and the axial groove 36 direct oil in the interior of the seal 100 back toward the oil-side opening 32, and from there by gravity back to the oil side B.

Furthermore, the positioning of the open ends 32a, 32b of the oil-side opening 32 and the flange 38 are such as to inhibit oil from migrating from the oil side B, through the axial groove 36, and into the interior of the seal 100. Such an arrangement assists, in applications where splashing of oil is of concern, in hindering oil from splashing from the oil side B into the interior of the seal 100.

Figure 3:
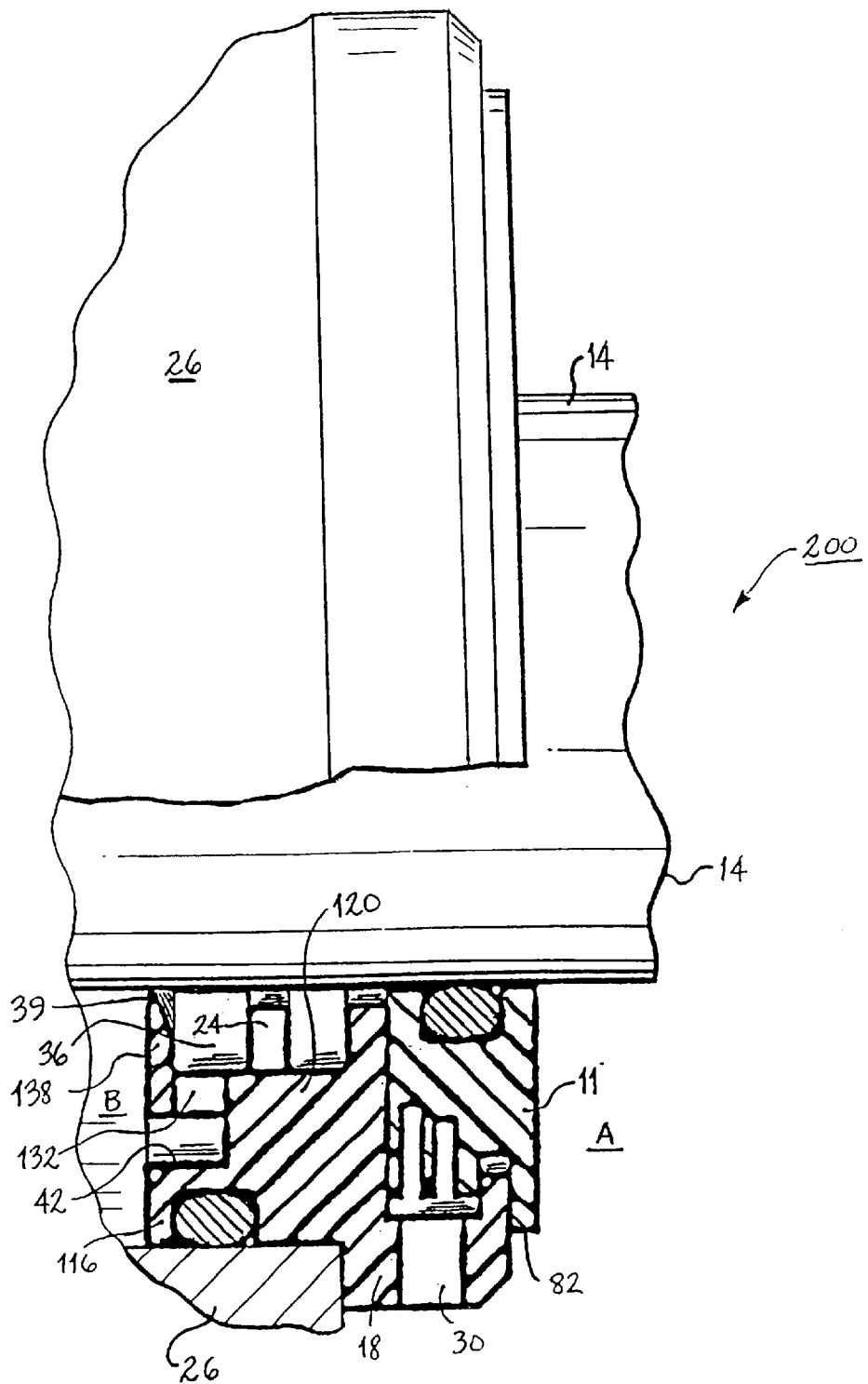
FIG. 3 is a partial cross sectional side view of a seal device constructed in accordance with a second preferred embodiment of the present invention.

A second preferred embodiment is illustrated in FIG. 3. Specifically, a two-piece, interlocked labyrinth seal 200 is shown having a rotor 11 and a stator 116. The stator 116 includes the cover 18 and a main portion 120 having an oil-side opening 132. The main portion 120 differs from the main portion 20 shown in FIG. 2 in that the opening 132 is shorter than the opening 32. Moreover, the opening 132 shown in FIG. 2 exits onto an undersurface 42 on the main portion 120 instead of the underside surface 27 of the housing 26. A shortened opening 132 allows for a shorter return egress for the oil back to the oil side B. As with the embodiment illustrated in FIGS. 1 and, 2, the embodiment shown in FIG. 3 includes the annular tip 39 of a flange 138. The tip 39 is annular and is close to or in contact with the entire periphery of the shaft 14.

Figure 4:
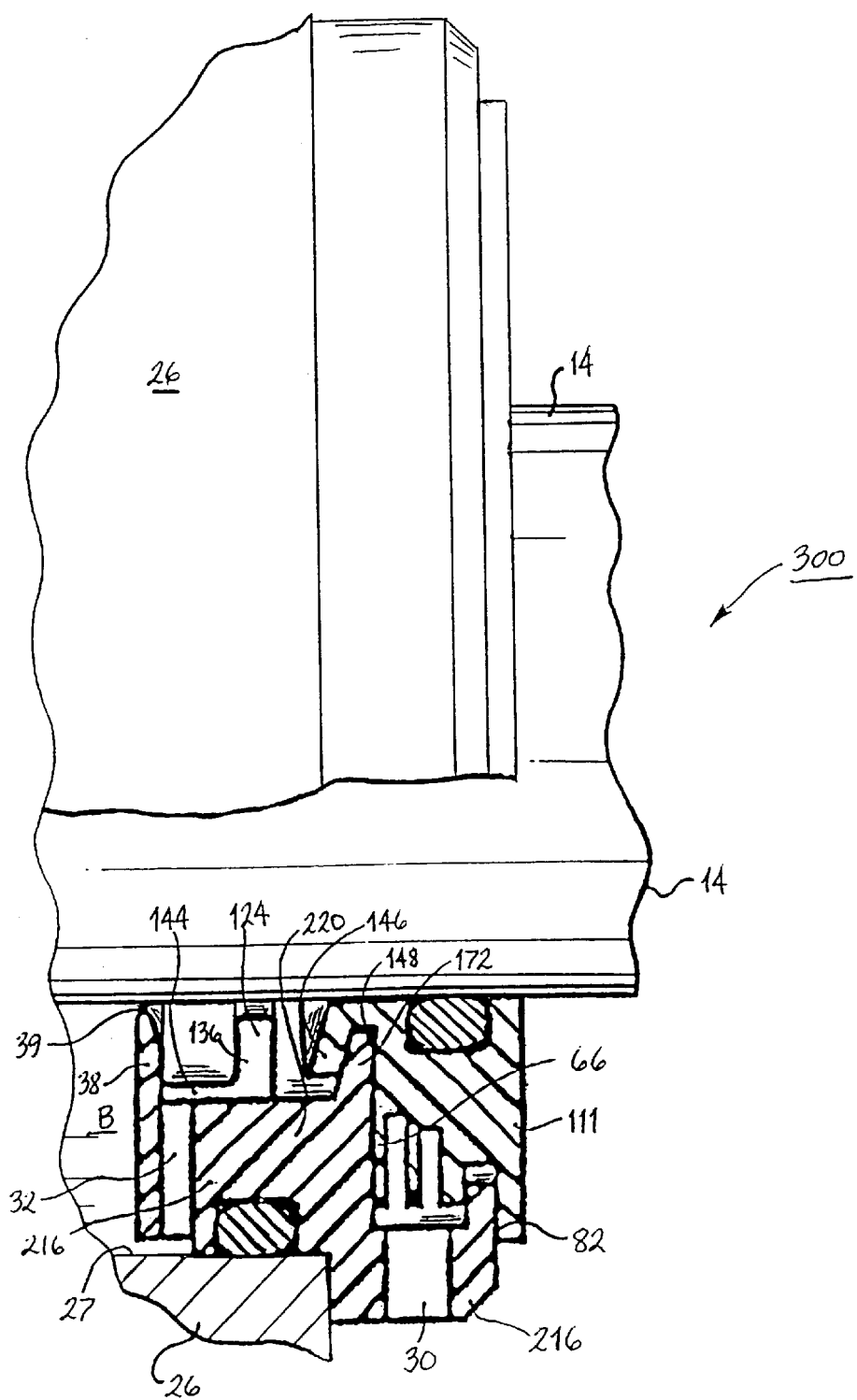
FIG. 4 is a partial cross sectional side view of a seal device constructed in accordance with a third preferred embodiment of the present invention.

A third preferred embodiment is illustrated in FIG. 4. Specifically, a two-piece, interlocked labyrinth seal 300 is shown having a rotor 111 and a stator 216. The rotor 111 differs from the rotor 11 (FIGS. 1–3) in that it includes a radially outwardly facing recess 148 between ridge 66 and a flange 146. The flange 146 acts as a slinger to direct oil back toward axial groove 36 and, ultimately, the oil side B. The stator 216 has a main portion 220 having an annular ridge 172 and an annular ridge 124. The annular ridge 124 includes a ledge 144. The annular ridge 172 differs from the annular ridge 72 in that it has a sloped surface to fit within the recess 148. The ridge 124 differs from the ridge 24 in that it is longer and it includes the ledge 144. The annular ridge 124 and the ledge 144 provide room for the axial groove 136 to extend to the flange 38. As with the previous embodiments, the embodiment shown in FIG. 4 has the annular tip 39 of the flange 38. The tip 39 is annular and is close to or in contact with the entire periphery of the shaft 14.

Figure 5:
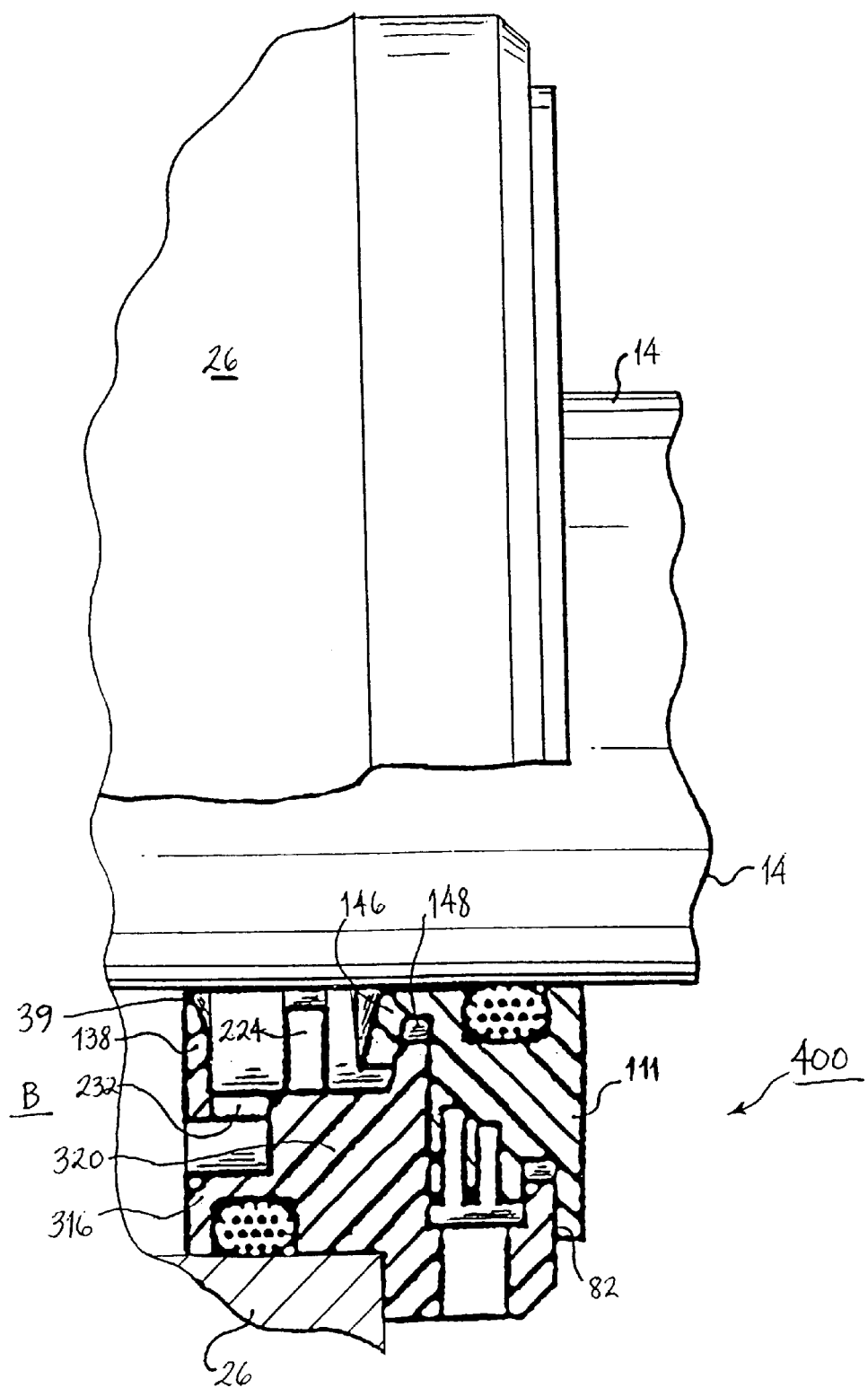
FIG. 5 is a partial cross sectional side view of a seal device constructed in accordance with a fourth preferred embodiment of the present invention.

A fourth preferred embodiment is illustrated in FIG. 5. Specifically, a two-piece, interlocked labyrinth seal 400 is shown having a rotor 111 and a stator 316. The stator 316 includes a main portion 320 having an annular ridge 224 and an oil-side opening 232. The ridge 224 is longer than the ridge 24. The opening 232 is shorter than the opening 132 (FIG. 2). As with the previous embodiments, the embodiment shown in FIG. 5 includes the annular tip 39 of the flange 138. The tip 39 is annular and is close to or in contact with the entire periphery of the shaft 14.

Figure 6:
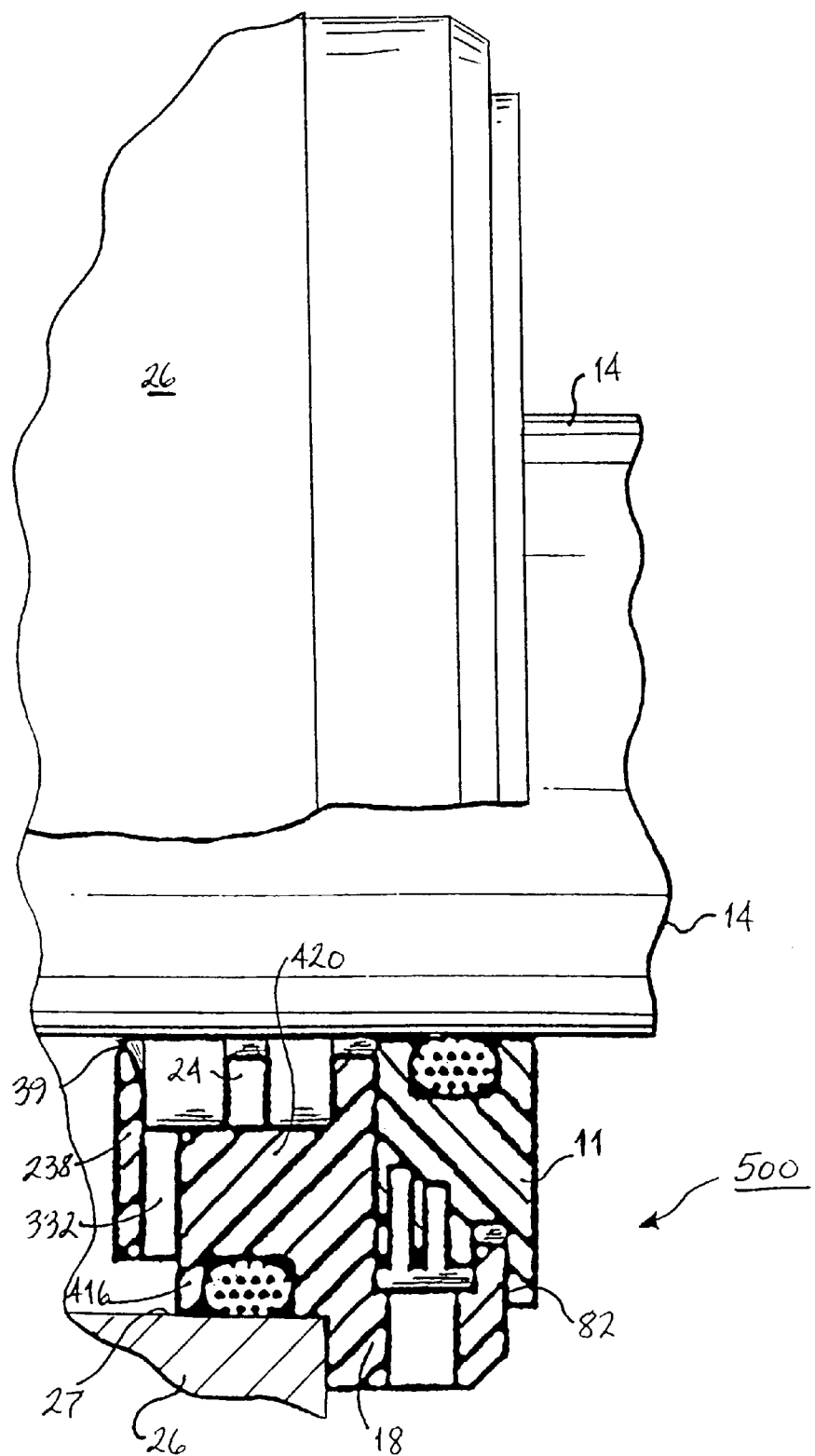
FIG. 6 is a partial cross sectional side view of a seal device constructed in accordance with a fifth preferred embodiment of the present invention.

A fifth preferred embodiment is illustrated in FIG. 6. Specifically, a two-piece, interlocked labyrinth seal 500 is shown having a rotor 11 and a stator 416. The stator 416 includes the cover 18 and a main portion 420 having an oil-side opening 332 and a flange 238. The main portion 420 differs from the main portion 20 shown in FIG. 2 in that the opening 332 and the flange 238 are shorter than the opening 32 and the flange 38, creating a larger distance between the opening 332 and the underside surface 27 of the housing 26. The greater distance between the opening 332 and the underside surface 27 of the housing 26 helps to inhibit oil returning through the opening 332 from splashing into the underside surface 27 and reentering the opening 332. The main portion 420 shown in FIG. 6 differs from the main portion 120 of FIG. 3 in that the opening 332 is longer than the opening 132. In addition, the opening 332 exits to the underside surface 27 of the housing 26 instead of on the undersurface 42 of the main portion 120 of FIG. 3. As with the embodiments described above, the embodiment shown in FIG. 6 includes the annular tip 39 of the flange 238. The tip 39 is annular and is close to or in contact with the entire periphery of the shaft 14.

Figure 8:
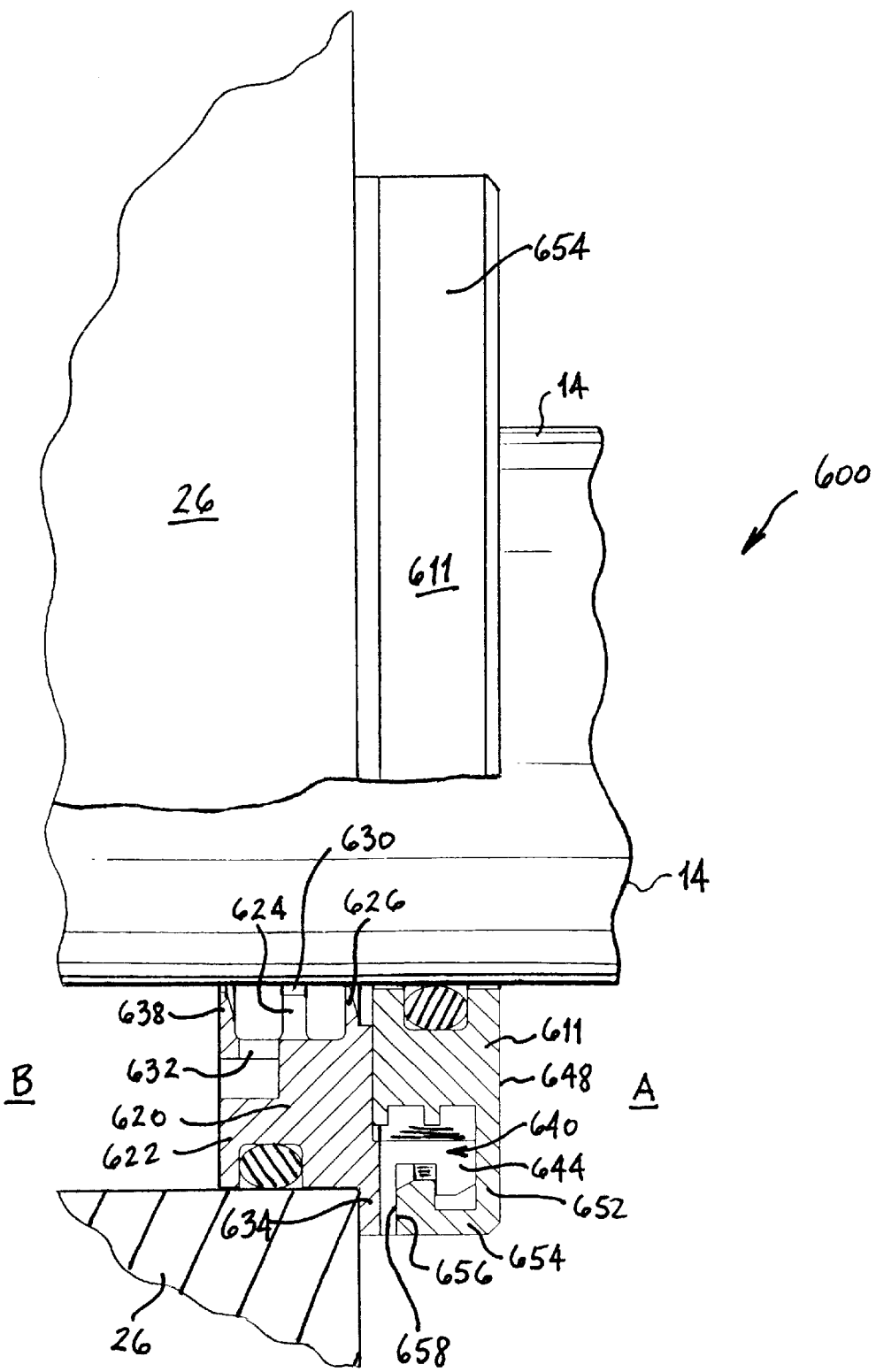
FIG. 8 is a partial cross sectional side view of a seal device constructed in accordance with a sixth preferred embodiment of the present invention.

FIG. 8 illustrates a wrap-around severe splash seal 600 mounted on the housing 26 and the rotating shaft 14. The seal 600 includes a stator 620 and a rotor 611. The stator 620 has a main body portion 622 and a cover 644. The main body portion 622 includes three annular ridges 626, 630, 638 extending inwardly toward the shaft 14 and a flange 634. The flange 634 serves as a shoulder for mounting the seal 600 on the housing 26.

The ridges 630 and 638 each extend toward the shaft 14 a smaller distance than the ridge 626. Specifically, the ridges 630 and 638 each have a small gap between themselves and the shaft 14 when the seal 600 is properly installed. The ridge 630 further includes an opening 624 to allow oil to return to the oil side B through an opening 632 in the stator body portion 622. The middle ridge 630 is optional. The ridge 626 is adjacent to the rotor 611 and is formed to be about shaft size, such that upon installation of the seal 600 on the shaft 14, the ridge 626 contacts the shaft 14 and restrict air flow. Alternatively, the ridge 626 may not contact the shaft 14 but may extend toward the shaft 14 to leave a gap smaller than the gap between the ridges 630, 638 and the shaft. The ridge 626 is thin, and so if it contacts the shaft 14 it will deform to the shaft without binding. Air flow may carry oil mist, and thus the ridge 626 assists in restricting the migration of oil from the oil side B to the air side A. During use, the inside diameter of the ridge 626 will alter to become the size of the circle created by the rotating shaft 14, including any shaft wobble.

The rotor 611 includes an intermediate portion 652 and an enclosure member 654 which extend around and define a radial opening 640. The cover 644 extends into the radial opening 640, and the enclosure member 654 interlocks with the cover 644 within the radial opening 640. When interlocked, an inwardly directed end face 656 of the enclosure member 654 is directly adjacent to an outwardly directed flange face 658 of the flange 634.

Figure 9:
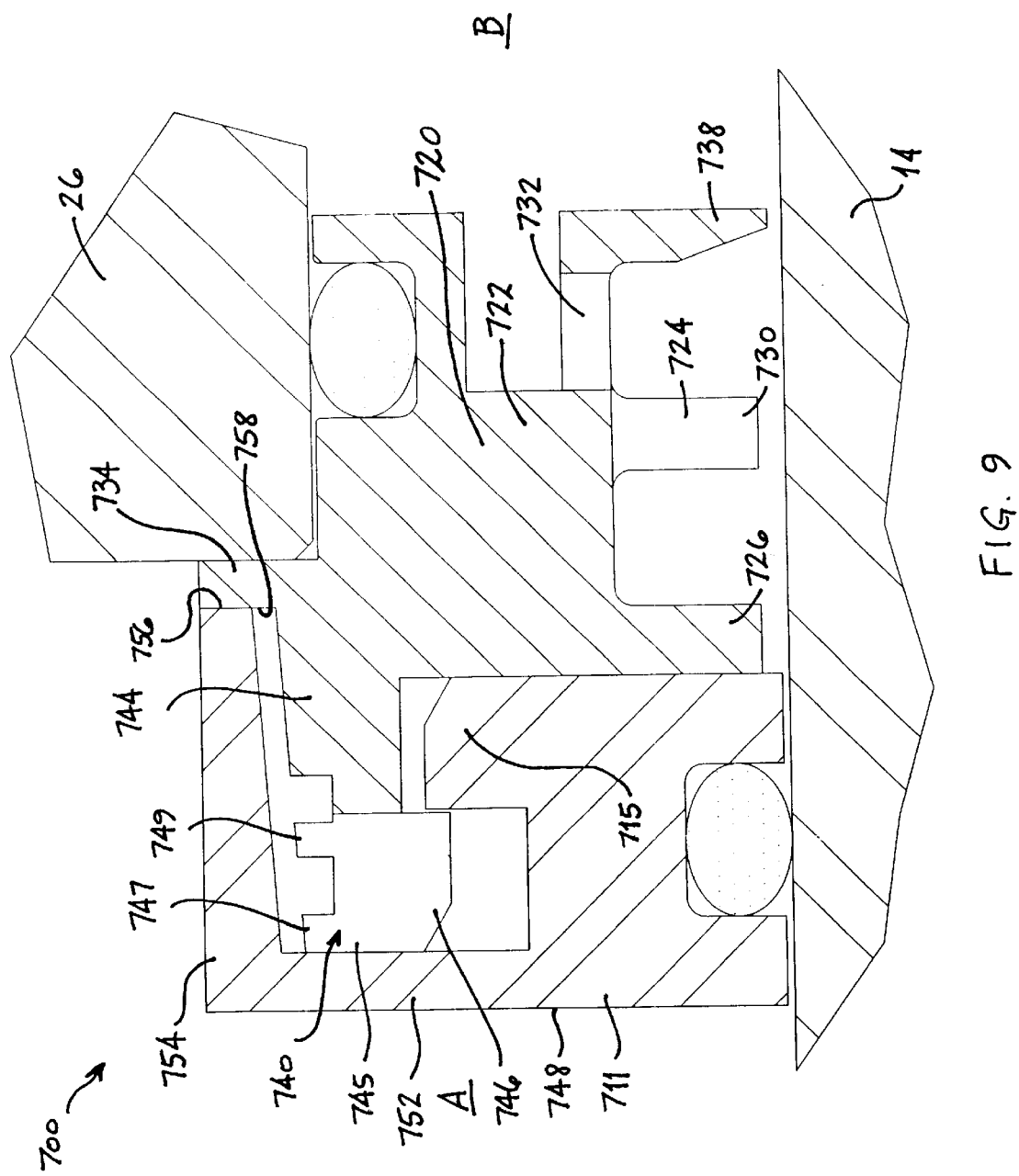
FIG. 9 is a partial cross sectional side view of a seal device constructed in accordance with a seventh preferred embodiment of the present invention.

An alternative wrap-around severe splash seal is illustrated in FIG. 9. The severe splash seal 700 includes a rotor 711 interlocked with a stator 720. The stator 720 has a main body portion 722 and a cover 744. The main body portion 722 includes three annular ridges 726, 730, 738 extending inwardly toward the shaft 14 and a flange 734 which serves as a shoulder for mounting the seal 700 on the housing 26.

The ridges 726, 730 and 638 each extend toward the shaft 14 and leave a small gap between themselves and the shaft 14 when the seal 700 is properly installed. The ridge 730 further includes an opening 724 to allow oil to return to the oil side B through an opening 732 in the stator body portion 722. The middle ridge 630 is optional. The cover 744 includes an interlocking portion 746, through which extends a radial opening 745. As illustrated, the cover 744 further includes a pair of flanges 747, 749 which assist in moving contaminants out of the seal 700.

The rotor 711 includes an intermediate portion 752, an enclosure member 754 and a flange 715, all of which extend around and define a radial opening 740. The cover 744 extends into the radial opening 740, and the interlocking portion 746 interlocks with the flange 715 within the radial opening 740. The enclosure member 754 is radially outside of the interlocking between the interlocking portion 746 and the flange 715. When interlocked, an inwardly directed end face 756 of the enclosure member 754 is directly adjacent to an outwardly directed flange face 758 of the flange 734.

The above description and drawings are only illustrative of certain preferred versions which achieve the objects, features and advantages of the present invention. It is not intended that the present invention be limited to these versions. For example, although two-piece seals are illustrated and described, the present invention is not to be so limited and can include seals with a different number of pieces. Further, although the seals illustrated and described include pieces which interlock one with the other, the present invention is not to be so limited and can include seals having separate pieces which do not interlock. In addition, while the direction between the open ends 32a, 32b is illustrated to be generally perpendicular to the shaft 14, it is to be understood that either of the ends 32a, 32b may be positioned closer to the oil side B than the other of the ends 32a, 32b. Also, while the flange 38 is described as part of the stator, it is to be understood that the flange 38 could instead be located on the rotor 11. Further, the rotor 11 can be any other suitable shape. For example, although the rotor 11 is shown to be radially interior to the cover 18 of the stator 16, the rotor 11 may instead extend radially outward of and wrap around the cover 18. In addition, while a rotating shaft is described, a rotating bore may be used instead by making a few minor adjustments, such as, for example, adding additional oil-side openings 32 to the stator, or, for the embodiment illustrated in FIG. 9, adding an air-side opening in the enclosure member 754.

What is claimed as new and desired to be protected by Letters Patent of the United States is:

1. A two-piece interlocked labyrinth seal, comprising:
a rotor including an intermediate portion and an enclosure member surrounding a radial opening; and
a stator including a main body portion, having three annular ridges, and a cover positioned within said radial opening, wherein said cover interlocks with said enclosure member, and wherein one of said annular ridges is adapted to restrict passage of air through the seal when the seal is mounted to a shaft, wherein two of said annular ridges extend a first distance and a third of said annular ridges extends a second distance, wherein said second distance is greater than said first distance.

2. The labyrinth seal of claim 1, wherein said stator comprises a flange which with said intermediate portion and said enclosure member encloses said cover within said radial opening.

3. The labyrinth seal of claim 1, wherein said third of said annular ridges inhibits passage of air through the seal when the seal is mounted to a shaft.

4. The labyrinth seal of claim 1, wherein one of said annular ridges includes an opening.

5. A two-piece interlocked labyrinth seal, comprising:
a rotor including an intermediate portion, an enclosure member and a flange surrounding a radial opening; and
a stator including a main body portion, having three annular ridges, and a cover positioned within said radial opening, wherein said cover interlocks with said flange, wherein two of said annular ridges extend a first distance and a third of said annular ridges extends a second distance, wherein said second distance is greater than said first distance and is sufficient to restrict passage of air through the seal.

6. The labyrinth seal of claim 5, wherein said stator comprises a flange which with said intermediate portion, said enclosure member and said flange of said rotor encloses said cover within said radial opening.

7. The labyrinth seal of claim 5, wherein said third of said annular ridges inhibits passage of air through the seal when the seal is mounted to a shaft.

8. The labyrinth seal of claim 5, wherein one of said annular ridges includes an opening.

9. The labyrinth seal of claim 5, wherein said cover includes an interlocking portion which interlocks with said flange.

10. The labyrinth seal of claim 9, wherein a radial opening extends through said interlocking portion.

11. The labyrinth seal of claim 10, wherein said interlocking portion includes a plurality of radially outwardly extending flanges.

12. A sealed system, comprising:
a rotatable shaft;
a housing; and
a two-piece interlocked labyrinth seal mounted on said housing and around said shaft, said seal comprising:
a rotor including an intermediate portion and an enclosure member surrounding a radial opening; and
a stator including a main body portion, having three annular ridges, and a cover positioned within said radial opening, wherein said cover interlocks with said enclosure member, and wherein one of said annular restricts passage of air between the seal and said rotatable shaft, wherein two of said annular ridges extend a first distance and a third of said annular ridges extends a second distance, wherein said second distance is greater than said first distance.

13. The sealed system of claim 12, wherein said stator comprises a flange which with said intermediate portion and said enclosure member encloses said cover within said radial opening.

14. The sealed system of claim 12, wherein said third of said annular ridges inhibits passage of air through the seal when the seal is mounted to a shaft.

15. The sealed system of claim 14, wherein said third annular ridge contacts said shaft when said seal is mounted on said housing and around said shaft.

16. The sealed system of claim 12, wherein one of said annular ridges includes an opening.

17. A sealed system, comprising:
a rotatable shaft;
a housing; and
a two-piece interlocked labyrinth seal mounted on said housing and around said shaft, said seal comprising:
a rotor including an intermediate portion, an enclosure member and a flange surrounding a radial opening; and
a stator including a main body portion, having three annular ridges, and a cover positioned within said radial opening, wherein said cover
interlocks with said flange, wherein two of said annular ridges extend a first distance and a third of said annular ridges extends a second distance, wherein said second distance is greater than said first distance and is sufficient to restrict passage of air between the seal and the rotatable shaft.

18. The sealed system of claim 17, wherein said stator comprises a flange which with said intermediate portion and said enclosure member encloses said cover within said radial opening.

19. The sealed system of claim 17, wherein said third of said annular ridges inhibits passage of air through the seal when the seal is mounted to a shaft.

20. The sealed system of claim 19, wherein said third annular ridge contacts said shaft when said seal is mounted on said housing and around said shaft.

21. The sealed system of claim 17, wherein one of said annular ridges includes an opening.

* * * * *